(12) United States Patent
Erickson et al.

(10) Patent No.: US 6,487,624 B1
(45) Date of Patent: Nov. 26, 2002

(54) METHOD AND APPARATUS FOR HOT SWAPPING AND BUS EXTENSION WITHOUT DATA CORRUPTION

(75) Inventors: Michael John Erickson, Loveland, CO (US); Daniel V. Zilavy, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/374,051

(22) Filed: Aug. 13, 1999

(51) Int. Cl.$^7$ ............................................. G06F 13/00
(52) U.S. Cl. ..................... 710/302; 710/58; 710/330; 307/64; 307/141
(58) Field of Search ................................. 710/300, 301, 710/302, 303, 304, 58, 330; 307/64, 141

(56) References Cited

U.S. PATENT DOCUMENTS

| | | | |
|---|---|---|---|
| 5,317,697 A | 5/1994 | Husak et al. ............... 395/325 |
| 5,604,873 A | 2/1997 | Fite et al. ................... 395/283 |
| 5,740,378 A * | 4/1998 | Rehl et al. .................. 710/302 |
| 5,758,102 A * | 5/1998 | Carey et al. ................ 710/302 |
| 5,862,393 A * | 1/1999 | Davis ......................... 710/302 |
| 5,938,771 A * | 8/1999 | Williams et al. ............ 713/310 |
| 6,008,550 A * | 12/1999 | Dorsey et al. .............. 307/141 |
| 6,274,949 B1 * | 8/2001 | Lioux et al. .................. 307/64 |

* cited by examiner

Primary Examiner—Rupal Dharia (57) ABSTRACT

A method and apparatus for hot swapping and bus extension without data corruption. During the hot swapping of a circuit board in a bus, the bus is extended onto or retracted from the circuit board in a manner which does not corrupt the data on the bus. The extension or retraction of the bus is detected and a bus reset is asserted interrupting and preventing transactions on the bus. The bus reset is asserted for a minimum amount of time to allow the bus to stabilize after the hot swap. A bus extension/retraction detection component and a bus reset component perform these functions.

26 Claims, 10 Drawing Sheets

METHOD AND APPARATUS FOR HOT SWAPPING AND BUS EXTENSION WITHOUT DATA CORRUPTION

FIELD OF INVENTION

The current invention relates to maintaining the integrity of data on a bus during the installation and removal of a circuit board in a system and the extension and retraction of the bus during live bus activity.

BACKGROUND OF THE INVENTION

Hot swapping is the insertion or removal of a circuit board in a system without powering down the whole system. Generally, it requires that all bus activity be stopped before allowing the hot swap to take place. Therefore, the user must force all applications using the bus to cease transactions, swap the board, and then restart the transactions. Some devices can be hot-swapped without quieting the bus, but, most of these devices are relatively simple, accessing the bus only in one place and appearing as short "stubs" on the bus. For boards having multiple devices on them, the bus must be extended onto or retracted from the board during the hot swap. For such boards, hot swapping while the bus is active will likely cause data corruption with potentially catastrophic consequences.

Some hot swap schemes employ mechanical, electrical, and electro-mechanical means to allow circuit board insertion and extraction. Likewise, many hot swap schemes use staggered pin lengths to control power connection and disconnection and circuitry to connect and disconnect output drives from control and signal buses. None of these hot swap schemes takes into account the extension or retraction of the bus onto or from the circuit board during the hot swap, nor do they allow bus activity during hot-swapping or prevent data corruption due to the instability of the bus during this extension or retraction.

SUMMARY OF THE INVENTION

The invention is a method and apparatus that allows for bus extension or retraction when hot-swapping a circuit board into an enclosure with the power on and an active bus. More definitively, it allows the active bus to be extended onto the circuit board being installed without data corruption. With the bus extended onto the circuit board, multiple devices on the circuit board can access the bus. Moreover, in a dual controller enclosure, with two redundant controller boards, data being passed on the $1^{st}$ channel corresponding to one of the controller boards does not have to be stopped while the other controller board is being replaced due to failure. Therefore, the invention allows for the bus to be extended or retracted without a user having to go through the extra steps of stopping all device activity before swapping hardware.

When the bus is extended from a mid-plane in an enclosure, the mid-plane bus terminator is turned off, the bus extends onto the circuit board, and bus terminators on the end of the board are turned on. If the bus is active, however, this can cause data corruption. Accordingly, the invention enforces a bus reset upon detecting the extension of the bus which stops device activity until the bus terminators on the end of the board are fully active and the associated midplane terminators are inactive. Once the bus terminators on the end of the board are fully active, the bus is stable, and the bus reset is de-asserted. This allows device activity to resume on the bus. When the bus is retracted from the board onto the midplane, a similar process takes place, with the terminators being turned off and turned on in the opposite order. A bus reset is similarly asserted and de-asserted once the midplane bus terminator is fully active.

The preferred apparatus comprises a bus extension/retraction detection component and a bus reset assertion component. These components perform the bus extension/retraction detection and bus reset assertion and de-assertion steps of the preferred method. In an embodiment, these components are located on the controller boards in a dual controller enclosure so that the controller boards monitor each other for hot-swapping.

In a preferred embodiment, the bus extension/retraction detection component detects the bus extension or retraction by receiving as inputs the states of the longest set of pins and the shortest set of pins from the board being hot swapped. The only time the inputs of both the longest set and shortest set of pins are high is when the board is either being inserted or extracted from the system, i.e., during the extension/retraction of the bus.

In a preferred embodiment, the bus reset assertion component outputs the reset signal through a series of Schmitt trigger inverters with a RC combination that acts to extend the pulse at the output of the second inverter. The RC combination is configured to extend the pulse for sufficient time to allow the second bus terminator to fully activate, and thus, for the bus to stabilize.

The bus reset assertion component is interfaced with the bus to produce the appropriate type of output signal required by the bus devices. For example, in a preferred embodiment the interface produces an open-collector output. In another embodiment, the output is a differential output.

DETAILED DESCRIPTION OF THE INVENTION

The present invention involves hot swapping a circuit board onto a common bus 30 on a midplane 32. The common bus 30 on the midplane 32 is a single line or set of single lines to which a number of devices 33 are connected and over which information and data is transferred. Such a common bus 30 is shown on a midplane 32 in FIG. 1a. The bus 30 is terminated at both ends of the midplane 32 by active bus terminators 34. The devices 33 connected to the bus 30 are all situated such that they appear only as short "stubs"; i.e., the traces do not tee very far to connect to each device. This allows for clean signaling.

Figure 1A:
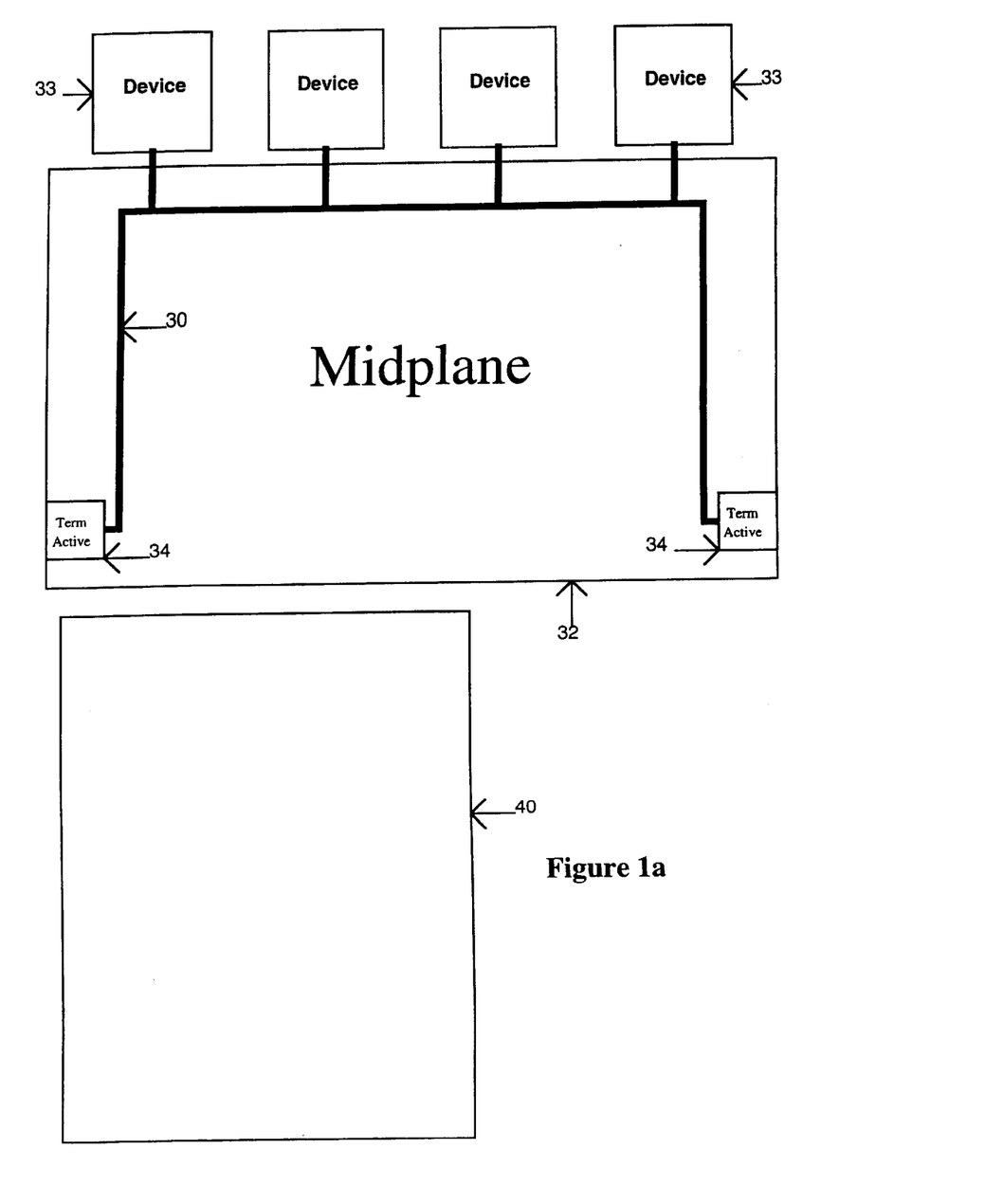
FIG. 1a is a block diagram of a non-extractable midplane with an unextended bus.
Figure 1B:
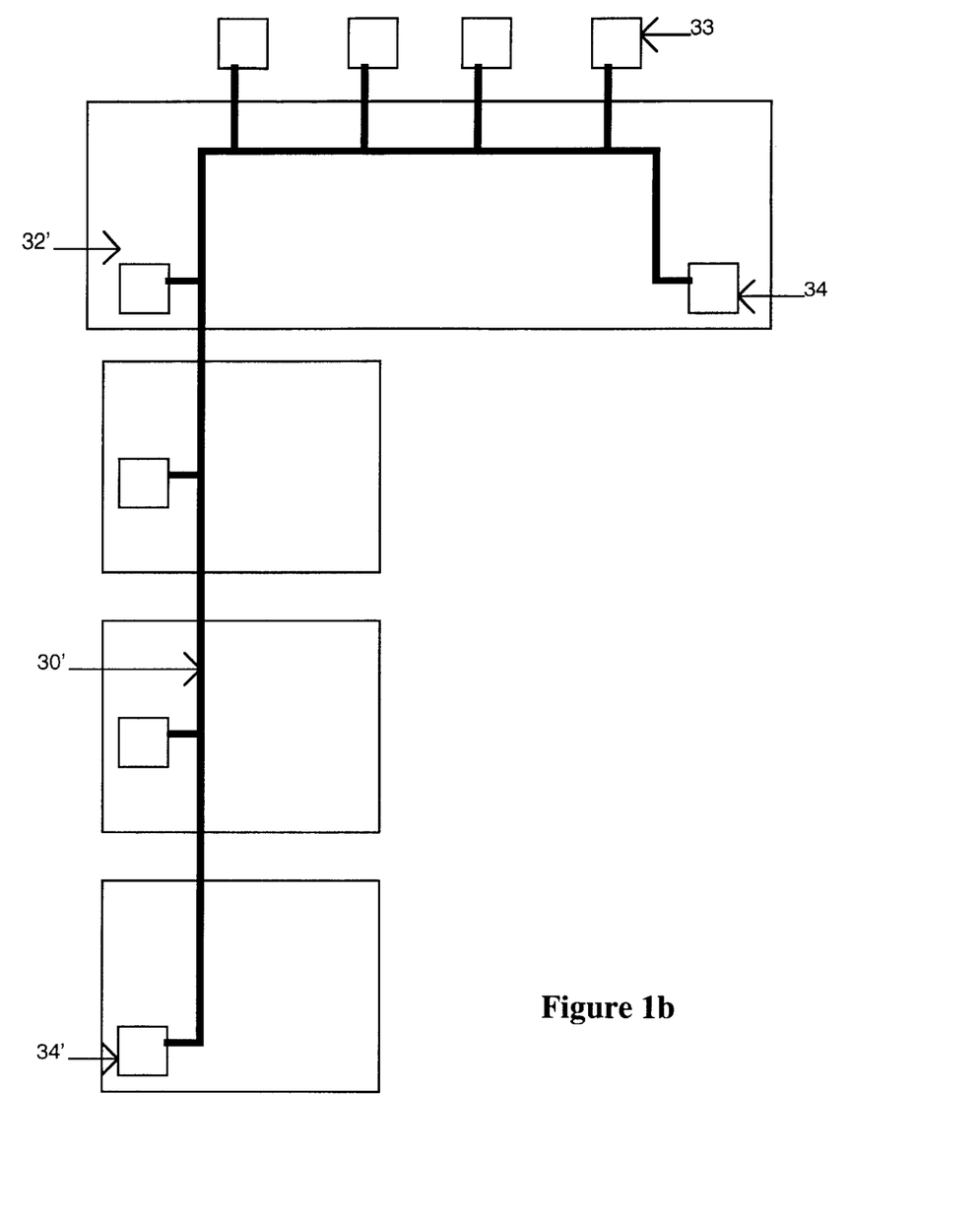
FIG. 1b is a block diagram of a midplane with a series of extractable circuit boards.

The midplane 32 in FIG. 1a is a non-retractable or non-extractable circuit board. In another embodiment, the midplane 32' includes a series of extractable circuit boards connected to one another, with the bus 30' extending onto each extractable board, as shown in FIG. 1b. A controller board 40 (not shown) that is hot-swapped onto the bus 30, as discussed below, would attach to the end of the extractable circuit boards. The bus terminator 34 at the end of the series of extractable circuit boards would be turned off to extend the bus during the hot-swap (see below).

Figure 2:
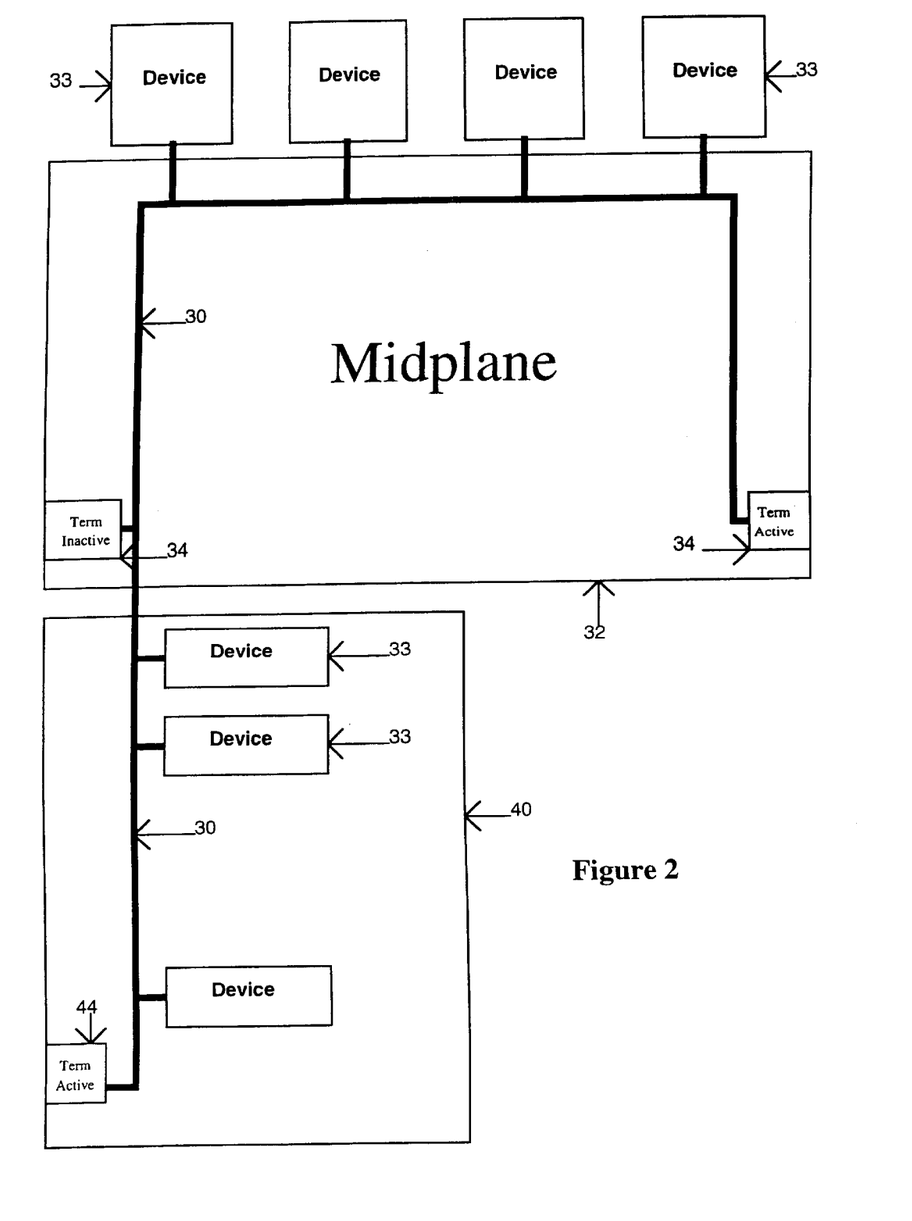
FIG. 2 is a block diagram of a midplane with a bus extended onto a first controller board.

The bus 30 in FIG. 1a is a nonextended bus since it does not extend off of the midplane 32 beyond the active bus terminators 34. FIG. 2 shows an extended bus in which the bus 30 actually extends onto an attached circuit board. The circuit board shown here is a first controller board 40 with multiple devices 33 connected to it. Since the bus 30 is extended into the controller board 40, the devices 33 on the controller board 40 can access the bus 30 with relatively short stubs. As above, the short stubs allow for clean signaling. The bus 30 extends to one end of the controller board 40 ending at an active bus terminator 44 on the controller board 40. The bus terminator 34 on this end of the midplane 32 is turned off. Likewise, if the midplane 32' includes a series of extractable circuit boards, the bus terminator 34 at the end of the series of extractable circuit boards is turned off (not shown).

Figure 3A:
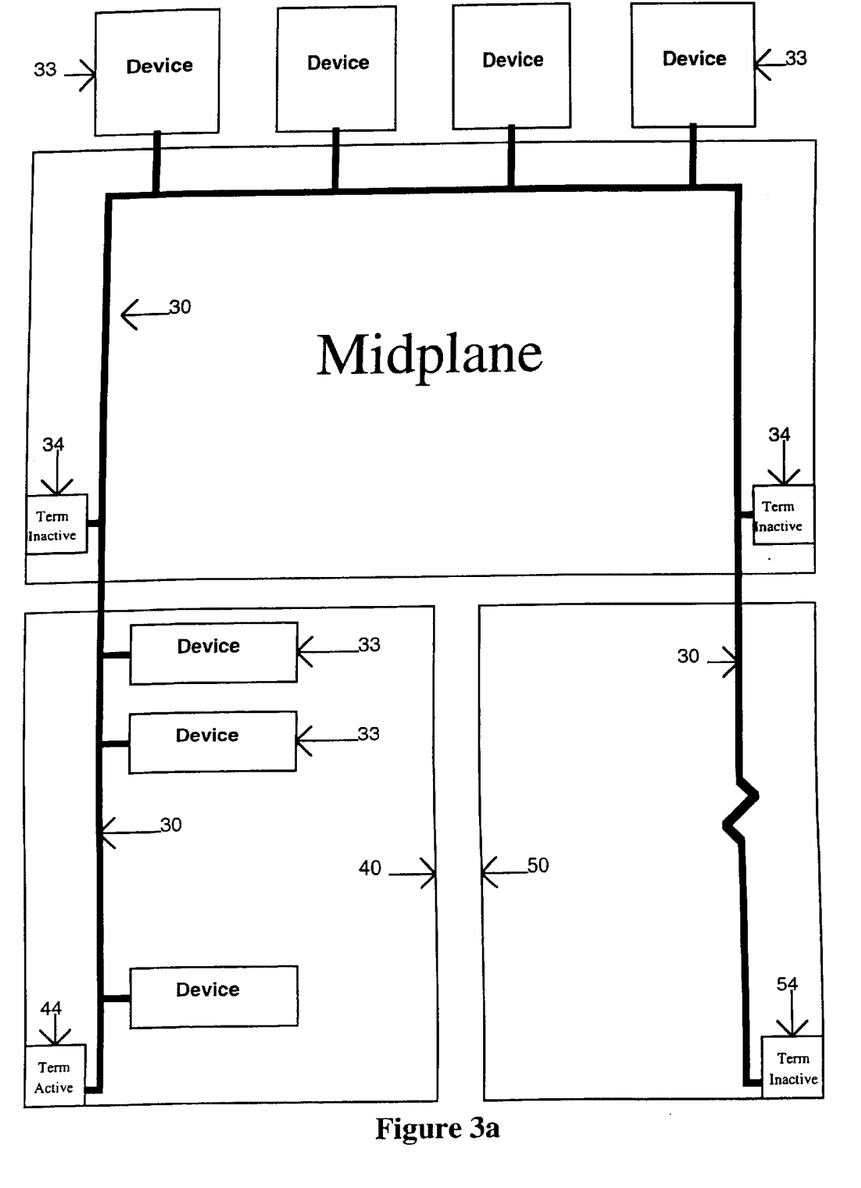
FIGS. 3a and 3b are block diagrams illustrating a hot swap and the extension of the midplane bus onto a second controller board.
Figure 3B:
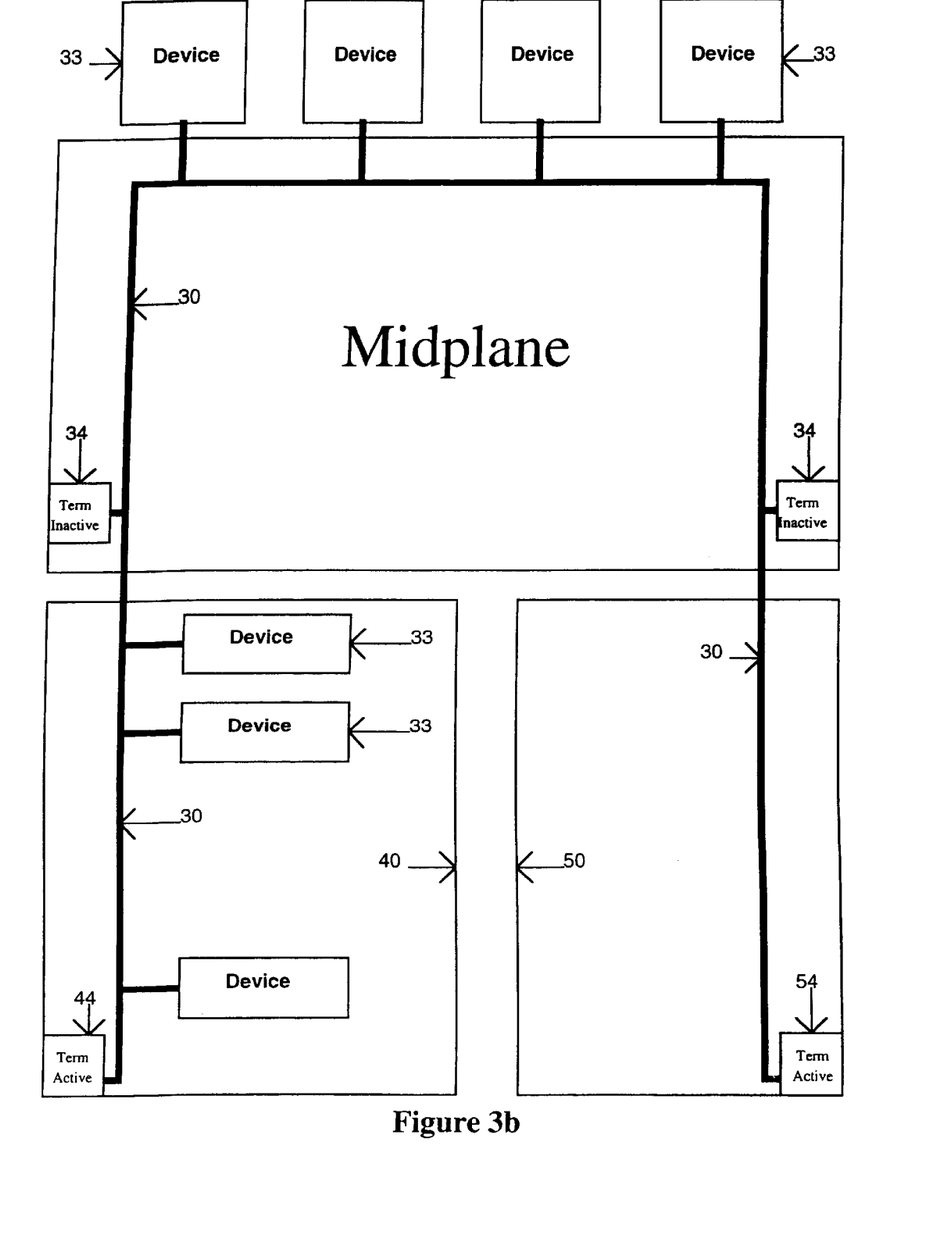

The process of inserting or extracting a circuit board and extending or retracting the bus 30 while the power is on is known as "hot swapping." The hot swapping of a second controller board 50 is illustrated by FIGS. 3a and 3b. In FIG. 3a, the controller board 50 is physically inserted into the midplane 32, which causes the deactivation of the bus terminator 34 at the end of the midplane 32 where the controller board 50 is inserted. This allows the bus 30 to extend off the midplane 32 and onto the controller board 50.

Although the bus 30 has extended onto the controller board 50, it is unstable since the bus terminator 54 on the controller board 50 has not become fully active. This is due to the fact that the time period for deactivating or turning off the bus terminator 34 on the midplane 32 is less then the time period for activating or powering up the bus terminator 54 on the controller board 50. During the time between the deactivation of the bus terminator 34 on the midplane 32 and the activation of the bus terminator 54 on the controller board 50, the bus 30 is unstable, as illustrated in FIG. 3a.

FIG. 3b shows that the bus 30 is stable and extended on the controller board 50 since the bus terminator 54 on the controller board 50 is fully active. If the bus 30 were actively passing data during the hot-swap illustrated in these FIGS. 3a and 3b, the extension of the bus 30 could have caused data corruption due to the instability of the bus 30 and the changing physical characteristics of the bus 30.

In a preferred embodiment of the present invention, this data corruption is prevented by issuing a bus reset on the bus 30 to stop device activity until the bus 30 is stable. The bus reset is enforced by the controller board 40 that is active on the bus 30. The controller board 40 monitors the bus 30 and issues a reset when a hot swap occurs. When a bus 30 is accessed by two controller boards, the controller boards monitor each other for hot swapping.

Figure 4:
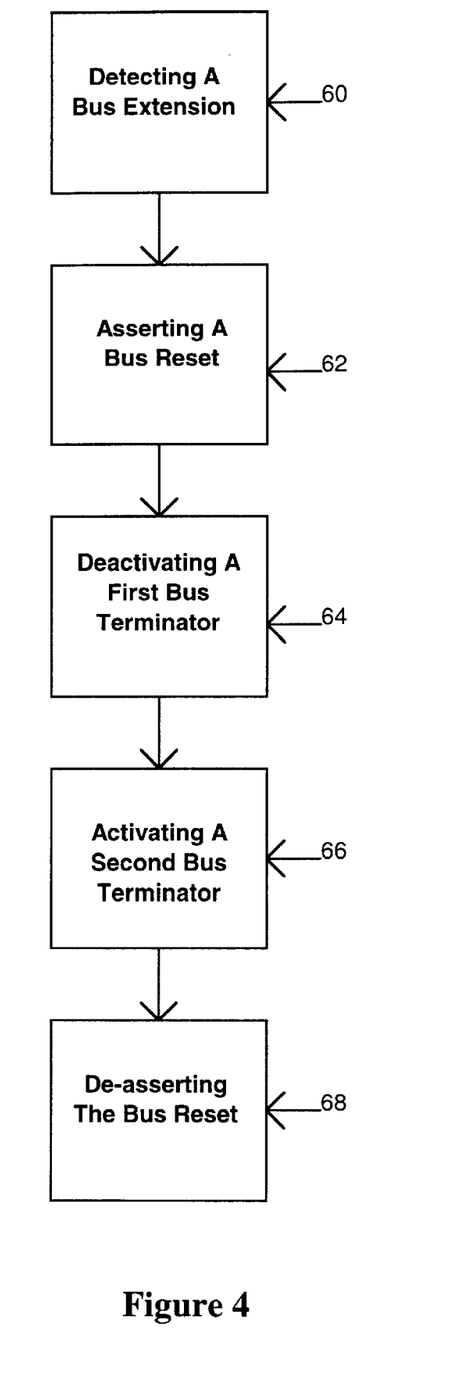
FIG. 4 is a flow diagram of a preferred method of extending a bus without data corruption.

As shown in FIG. 4, the first step in extending a bus 30 without data corruption is detecting a bus extension 60. The extension of the bus 30 indicates that a hot swap is taking place and that the physical characteristics of the bus 30 are changing. Preferably, detecting a bus extension 60 is accomplished by receiving an input or input(s) indicating that a circuit board is being hot swapped and the bus is being extended. The following step, asserting a bus reset 62 is executed in response to the detection of the bus extension.

Asserting a bus reset 62 clears the bus 30 of all active transactions and informs the devices 33 which initiated these transactions on the bus 30 that the outstanding transactions must be reinitiated. Typically, asserting a bus reset 62 is executed by outputting a signal that causes the bus 30 to reset. Any device 33 active on the bus 30 allows all of its lines to return to a default inactive state. Until the bus reset is deasserted, no transactions can take place on the bus 30.

The third step in a preferred method is deactivating a first bus terminator 64 (See FIG. 4). Deactivating a first bus terminator 64 allows the bus 30 to extend beyond the bus terminator 34, as seen in FIG. 3a. A bus terminator is typically activated with an enabling signal. The default of the enabling signal is usually on, so that the bus terminator is activated when the circuit board is powered up. When a circuit board is hot swapped in the midplane 32, the enabling signal for the bus terminator 34 is turned off, and the enabling signal for the circuit board bus terminator is turned on as the board powers up, Once the first bus terminator is deactivated, the bus 30 will not terminate at the first bus terminator and it will not be stable until a second bus terminator is fully active.

The next step is activating a second bus terminator 66 (See FIG. 4). During extension of the bus 30, the activation of the second bus terminator 54 allows the bus 30 to be stably extended onto the second controller board 50. Once the second bus terminator is fully active, the bus 30 does not extend beyond the now active second bus terminator (See FIG. 3a).

The last step shown in FIG. 4 is de-asserting the bus reset 68. The bus reset is kept asserted for a minimum amount of time to allow the second bus terminator 54 to become fully active and for the bus 30 to stabilize. Once the bus 30 is stable, the bus reset can be de-asserted and transactions interrupted by the bus 30 reset can be reinitiated and resumed.

The method for retracting a bus 30 without data corruption basically follows the same steps as illustrated in FIG. 4. During retraction of the bus 30, the first bus terminator deactivated is the bus terminator 54 on the controller board being extracted. The second bus terminator activated is the bus terminator 34 on the midplane 32. Otherwise, the remaining steps are the same, although the second step is detecting a bus retraction, instead of an extension, and the bus reset is asserted in response to the detection of the bus retraction.

Figure 5:
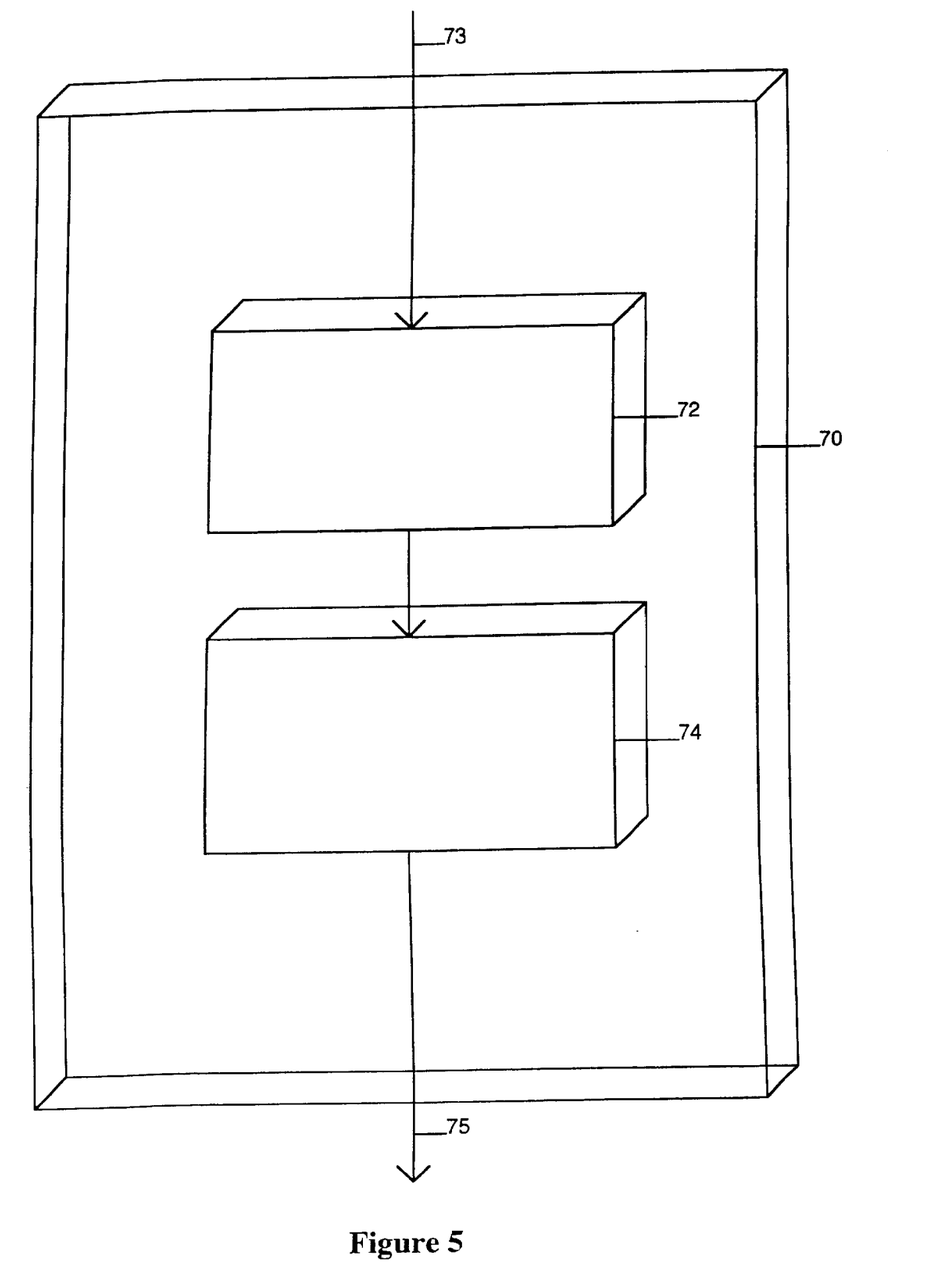
FIG. 5 is a block diagram of a preferred apparatus for extending a bus without data corruption.

FIG. 5 shows a preferred embodiment of an apparatus for extending or retracting the bus 30 from the midplane 32 without data corruption. The apparatus 70 includes a bus extension/retraction detection component 72 (or detection component) and a bus reset assertion component 74. These two components are located on the controller board 40 which is connected to the midplane 32 and passing data on the bus 30 while in use. The bus extension/retraction detection component 72 receives at least one input 73 and determines when the bus 30 is being extended or retracted from the at least one input 73. Detection of a bus extension or retraction, as described above, indicates that a hot swap is taking place and that the controller board 50 or other circuit board is being inserted or removed.

The bus reset assertion component 74 communicates with the bus extension/retraction detection component 72. The bus reset assertion component 74 asserts a bus reset that terminates all transactions on the bus 30 when the bus extension/retraction detection component 72 detects that the bus 30 is being extended or retracted. Likewise, the bus reset assertion component 74 de-asserts the bus reset and allows transactions to resume on the bus 30 after a sufficient time period to allow the bus extension/retraction to be fully completed (i.e., for the second bus terminator to become fully active). The assertion and de-assertion of the bus reset is output through at least one output 75 that can be configured to the requirements of the bus 30 and the devices 33 on the bus 30.

Figure 6:
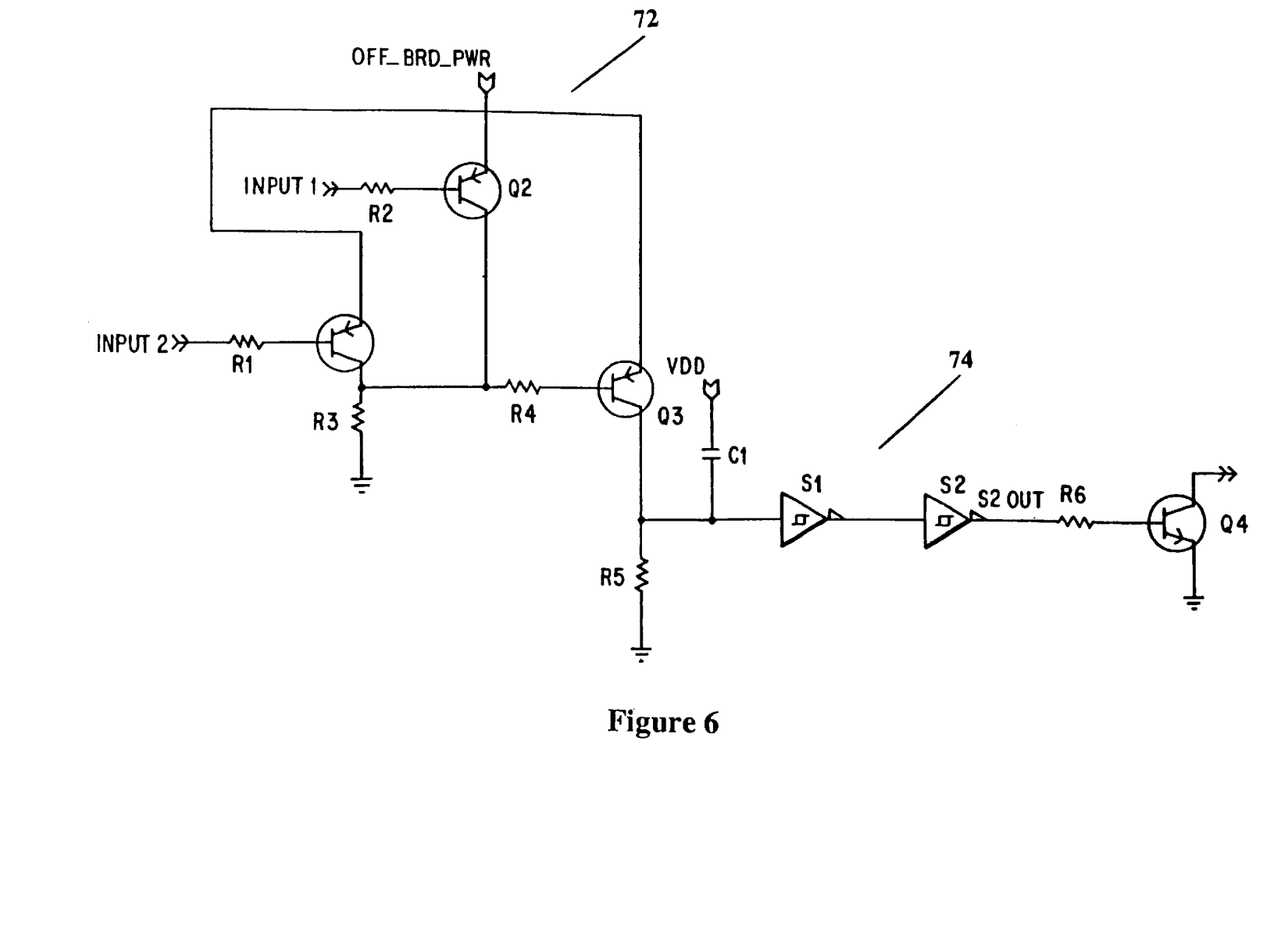
FIG. 6 is a logic circuit diagram for an implementation of an apparatus for extending a bus without data corruption comprising an open collector output

FIG. 6 shows a preferred embodiment of the implementation of the bus extension/retraction detection component 72 and bus reset assertion component 74. There are a number of possible implementations of the bus extension/retraction detection component 72 and bus reset assertion component 74. For example, these components can be modified depending on the type of output that is required by the bus 30 and the devices 33 on the bus 30. The output can be any of a variety of outputs, including an open collector output or a differential output. The embodiment shown in FIG. 6 produces an open collector output.

In the embodiment shown in FIG. 6, the bus extension/retraction detection component 72 receives as inputs the states of staggered pins of a circuit board being inserted. From a controller board 50 having three lengths of staggered pins, the bus extension/retraction detection component 72 receives as input two signals from the staggered pins. One input comes from the longest set of pins and one input comes from the shortest length set of pins. The two inputs are wired through a NAND function implemented using two Bipolar Junction Transistors or BJTs (see FIG. 6). When the controller board 50 is completely inserted, the signal from either the longest length set of pins or the shortest length set of pins is low and the other is high. The only time both input signals are high is when the controller board 50 is in transition, i.e., when the controller board 50 is either being inserted or extracted from the system.

Figure 7:
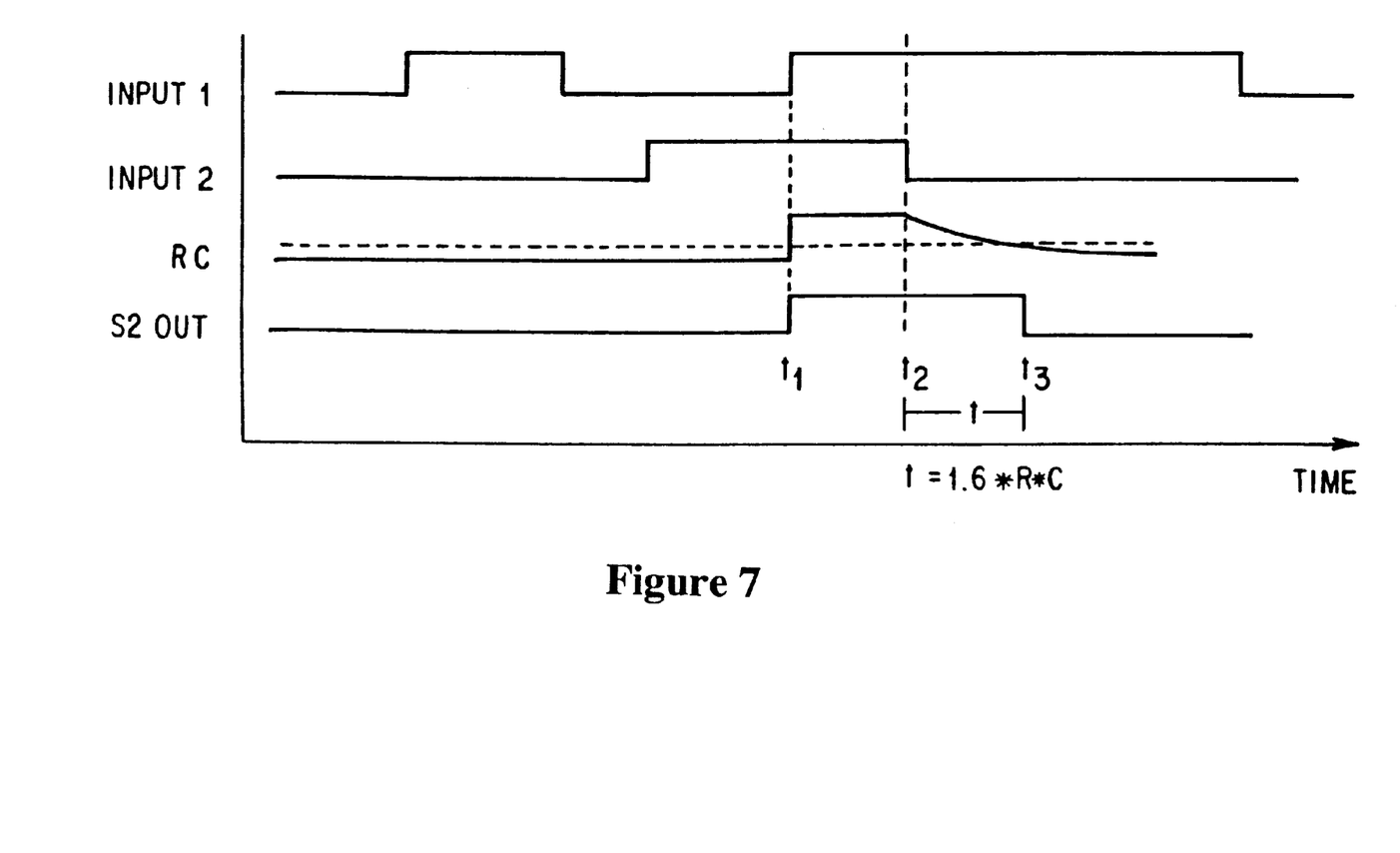
FIG. 7 is a timing diagram for an implementation of an apparatus for extending a bus without data corruption.

When both input 1 and input 2 are high (logic 1) (see time $t_1$ on FIG. 7), then neither Q1 nor Q2 is biased on. (Both input 1 and input 2 are high when the controller board 54 is in transition, i.e., being inserted or being extracted). Consequently, no current will flow through R3. The voltage at the collectors of Q1 and Q2 will be low or ground in this case (logic 0). This low (logic 0) will draw current from the base of Q3, causing Q3 to be biased on and causing current to flow through resistor R5. R5 will rapidly charge to voltage VDD (logic 1). This voltage is input to the Schmitt trigger inverter, S1, whose output will drop to low (logic 0). The input of inverter S2 is connected to the output of inverter S1. S2 will invert the low (logic 0) to a high (logic 1).

If either input 1 or input 2 goes low (logic 0) (see time $t_2$ on FIG. 7), then the corresponding transistor (Q1 or Q2) will be biased on. Consequently, current will flow through that transistor, either Q1 or Q2, causing current to flow through R3. will produce a voltage across R3 causing a high (logic 1) to be output at both collectors of transistors Q1 and Q2. (In fact, the only time a high (logic 1) does not appear at the output of transistors Q1 and Q2 is when both input 1 and input 2 are high. See above. Therefore, transistors Q1 and Q2 function as a NAND gate). The voltage across resistor R3 is input to the base of transistor Q3. This biases Q3 off. Consequently, no current will flow through resistor R5 which is connected to the collector of transistor Q3. The voltage across R5 will be pulled to ground. As a result, the input of inverter S1 will be pulled to ground (logic 0). Inverter S1 will invert this input to a high (logic 1). The input of inverter S2 is connected to the output of inverter S1. S2 will invert the high (logic 1) to a low (logic 0).

However, the output of S2 will not switch to a low (logic 0) immediately. The voltage across resistor R5, VDD, will discharge to ground voltage through the R5, C1 combination, where C1 is the capacitor connected between voltage VDD and the end of resistor R5 not connected to ground. Since inverter S1 is a Schmitt trigger inverter, its output will not switch to (high) logic 1, until the voltage at the input to S1 crosses a positive going threshold voltage ($V_{T+}$). This will occur $1.6*R5*C1$ seconds after input 1 or input 2 goes low (see time $t_3$ on FIG. 7). Inverter S2 inverts this high (logic 1) to a low (logic 0). Therefore, the RC combination acts to extend the time duration of the pulse at the output of inverter S2. It effectively acts as a time extender circuit. Consequently, the output pulse from inverter S2 remains asserted during the period of time when one or both inputs are logic 1 and for a time period after one of the inputs goes to logic 0, determined by the equation $1.6*R5*C1$.

The time period that the output pulse remains asserted is calculated to be sufficiently long enough to allow the second bus terminator, in this case bus terminator 54 to be fully activated, i.e., for the bus to stabilize. Also the time period needs to be long enough to meet the minimum bus reset requirement for the bus 30. The minimum bus reset requirement is determined by the type of bus. In a preferred embodiment R5 is approximately 464 kΩ and C1 is approximately 0.1 µF.

Furthermore, as seen in FIG. 6, a series resistor, R6, is connected to the base of a transistor, Q4, to produce an open collector output from the bus reset assertion component 74. The open collector output is output on the line 1RST–. This output is received by devices 33 on the bus 30. When line 1RST– goes low, the device 33, as well as any other device 33 or device 43 on the bus 30, will allow all of its lines to return to a default inactive state. While line 1RST– remains low, i.e. the bus reset assertion component 74 continues to assert the bus reset, all of the device 33 lines will remain in the default inactive state. When line 1RST– goes high, i.e. the bus reset assertion component 74 de-asserts the bus reset, the device 33 will reinitiate the transaction interrupted by the bus reset and its lines will return to an active state.

Figure 8:
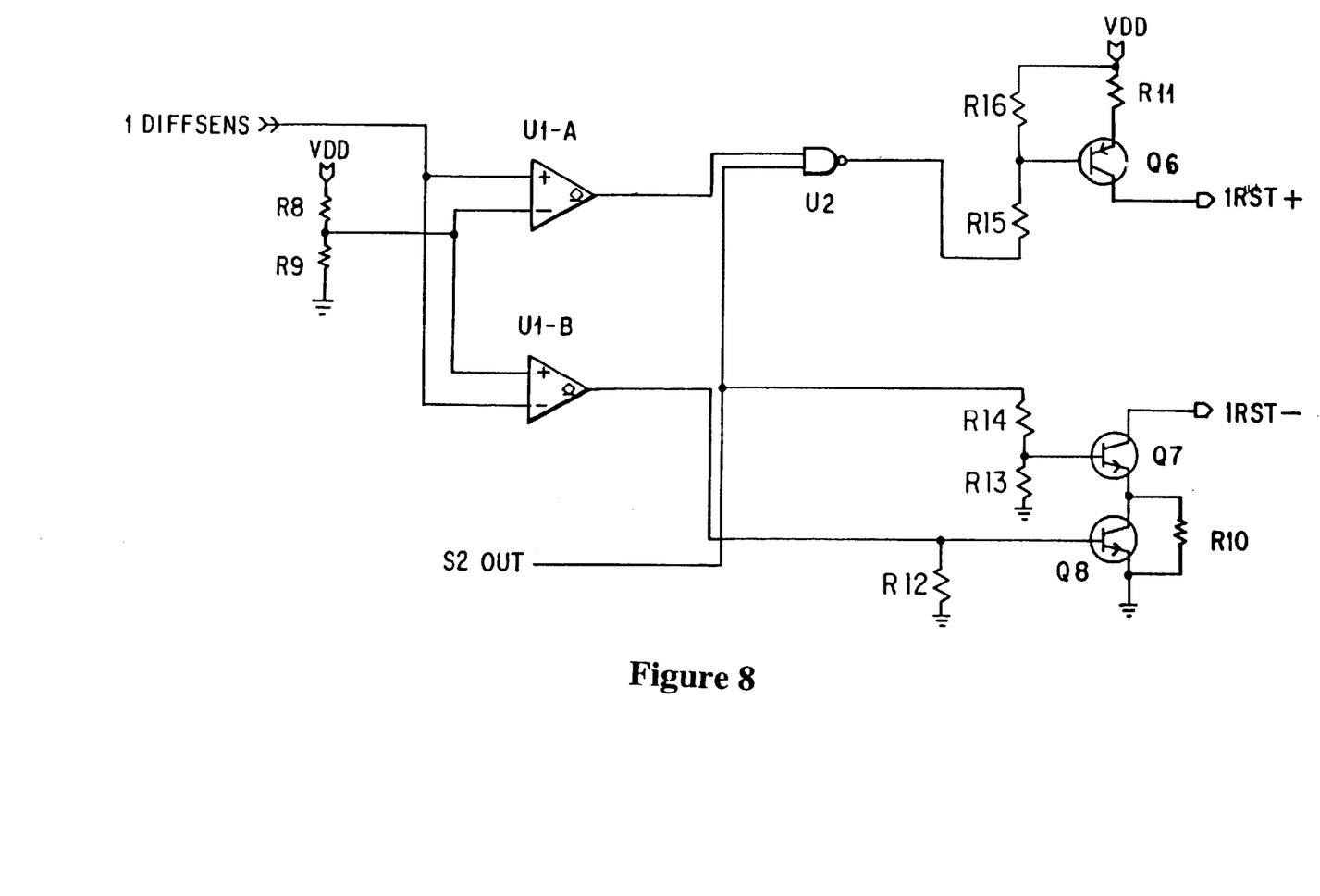
FIG. 8 is a logic circuit diagram for an implementation of an apparatus for extending a bus without data corruption providing differential bus reset output signal.

In another embodiment, the bus extension/retraction detection component 72 and bus reset assertion component 74 can be implemented to produce a differential output. FIG. 8 illustrates such an implementation of the bus extension/retraction detection component 72 and bus reset assertion component 74. In this implementation, the output of Schmitt trigger S2 is input to one input of a two input NAND gate U2 and, also, to the input of a transistor Q7. In addition, two comparators, U1-A and U1-B, are connected to provide complementary outputs. The output of the first comparator, U1-A, is input to the second input of NAND gate U2, while the output of the second comparator, U1-B, is input to transistor Q8. Resistors R8 and R9 act as a voltage divider, thereby setting a threshold voltage, (VDD*R9)/(R8+R9), for the complementary comparators, U1-A and U1-B. (In a preferred embodiment, the threshold is set at 0.7 Volts).

When differential outputs are desired, signal 1DIFFSENS goes HIGH. (In a preferred embodiment, 1DIFFSENS goes greater than 0.7 Volts). This causes the output of comparator U1-A to go logic HIGH. This will cause the NAND gate to track the output of Schmitt trigger, S2. For example, when the output of S2 is logic HIGH, the output of NAND gate U2 is low. Consequently, pnp transistor Q6 will be biased on and it will source current onto line 1RST+. On the other hand, when the output of S2 is logic LOW, the output of NAND gate U2 will go HIGH. Consequently, pnp transistor Q6 will be biased off, and no current will be sourced.

In addition, when signal 1DIFFSENS goes HIGH, the output of comparator U1-B will go logic LOW. This turns npn transistor Q8 off. As a result, current will through resistor R10. Also, transistor Q7 will track the output of Schmitt trigger S2. For example, when the output of S2 is logic HIGH, npn transistor Q7 will be biased on and act as a current sink, sinking current on line 1RST–. On the other hand, when the output of S2 is logic LOW, npn transistor Q7 will be biased off. Consequently, npn transistor Q7 won't sink current.

If operation in single ended mode is desired, signal 1DIFFSENS goes LOW. (In a preferred embodiment, 1DIFFSENS goes less than 0.7 Volts). This causes the output of comparator U1-A to go logic LOW. This will cause the output of NAND gate U2 to always remain at logic HIGH. Consequently, pnp transistor Q6 will always be biased off and no current will be sourced onto line 1RST+.

In addition, when signal 1DIFFSENS goes LOW, the output of comparator U1-B will go logic HIGH. This turns npn transistor Q8 on. Consequently, current will flow through transistor Q8, and not resistor R10. Transistor Q7 will still track the output of Schmitt trigger S2. For example, when the output of S2 is logic HIGH, npn transistor Q7 will be biased on and act as a current sink, sinking current on line 1RST–. However, in this case (single-ended mode), the current will be sunk to ground, as opposed to being sunk through a. resistor to ground (differential mode). When the output of S2 is logic LOW, npn transistor Q7 will be biased off. Consequently, npn transistor Q7 won't sink current. In a preferred embodiment, a switching apparatus can be substituted for transistor Q8.

In alternative embodiments the bus extension/retraction detection component 72 and bus reset assertion component 74 are located on the midplane 32. In such an embodiment, the bus extension/retraction detection component 72 and bus reset assertion component 74 would perform in a similar manner to that describe above. These components may also be located on the midplane 32' that includes a series of retractable circuit boards.

In another embodiment, the bus extension/retraction detection component 72 and bus reset assertion component 74 are located on the controller board being hot-swapped. In this embodiment, the bus extension/retraction detection component 72 is connected to the staggered pins of the controller board being swapped. In a board having three lengths of staggered pins, the bus extension detention component 72 receives as input two signals from the staggered pins. One input comes from the longest set of pins and one input comes from the shortest length set of pins. When the board is completely inserted, the signal from either the longest length set of pins or the shortest length set of pins is low and the other is high. The only time both input signals are high is when the board is in transition, i.e., when the board is either being inserted or extracted from the system. If both input signals are high, the bus reset assertion component 74 outputs the bus reset signal to the bus 30, as described above.

While the invention has been disclosed with reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. A method for extending or retracting a bus without data corruption, comprising:

detecting a bus extension or retraction, wherein the bus extension or retraction indicates that a hot swap is taking place;

asserting a bus reset, in response to the detection of the bus extension or retraction, wherein the asserted bus reset clears the bus of all active transactions;

deactivating a first bus terminator, wherein the bus does not terminate at the deactivated first bus terminator;

activating a second bus terminator, allowing the bus to be stably extended or retracted, wherein the bus does terminate at the activated second bus terminator; and de-asserting the bus reset, wherein the bus reset is asserted a minimum amount of time to allow the bus to stabilize and transactions interrupted by the bus reset can be reinitiated and resumed.

2. The method of claim 1, wherein the detecting a bus extension or retraction step further comprises the steps of:

receiving at least one input signal indicating the insertion or removal of a first circuit board;

processing the at least one input signal indicating the insertion or removal of the first circuit board; and generating an output signal indicating the insertion or the removal of the first circuit board.

3. The method of claim 2, wherein the asserting a bus reset step further comprises the step of:

extending the output signal for a period of time after the first circuit board is completely inserted or extracted and the bus stabilizes.

4. The method according to claim 3, further comprising the step of inverting the output signal.

5. The method according to claim 3, wherein the step of extending the output signal for a period of time after the circuit board is completely inserted or extracted further comprises the step of discharging a capacitor.

6. The method according to claim 3, wherein the asserting a bus reset step further comprises the steps of:

outputting a plurality of complementary control signals;

performing a logic operation using one of the complementary control signals and the output signal to produce a logic output;

using the logic output from the logic operation to source current; and sinking current using the output signal.

7. The method according to claim 2, wherein the step of processing further comprises the step of performing a logic function on the at least one input signal.

8. The method according to claim 7, wherein the logic function further comprises the step of performing a NAND logic function on the at least one input signal.

9. The method of claim 1, wherein the detecting a bus extension or retraction step is performed by a second circuit board onto which the bus is already extended.

10. The method of claim 1, wherein the asserting a bus reset step is performed by a second circuit board onto which the bus is already extended.

11. An apparatus for extending or retracting a bus without data corruption, comprising:

a detection component, wherein the detection component receives at least one input and determines when the bus is being extended or retracted from the at least one input; and a bus reset assertion component, that receives a signal from the detection component, wherein the bus reset assertion component asserts a bus reset when the detection component determines that the bus is being extended or retracted and de-asserts the bus reset after a minimum amount of time to allow the bus to stabilize, wherein the detection component and the bus reset assertion component are located on controller boards in a multi-controller enclosure, wherein the controller boards monitor each other for hot-swapping.

12. The apparatus of claim 11, wherein the detection component is located on a first controller board onto which the bus is extended while the first controller board is in use.

13. The apparatus of claim 12, wherein the first controller board monitors a second controller board for hot swapping while the first controller board is in use.

14. The apparatus of claim 12, wherein the at least one input is indicative of the insertion or removal of a second controller board.

15. The apparatus of claim 11, wherein detection component is located on a non-extractable midplane.

16. The apparatus of claim 11, wherein the detection component is located on an extractable circuit board.

17. The apparatus of claim 11, wherein the detection component further comprises a logic circuit having at least one output.

18. The apparatus of claim 17, wherein the bus reset assertion component further comprises a time extender circuit connected to the logic circuit, for extending an output signal of the logic circuit for a period of time.

19. The apparatus according to claim 17, wherein the logic circuit further comprises a NAND gate.

20. The apparatus according to claim 19, wherein the NAND gate further comprises:

a plurality of transistors connected in parallel having a plurality of inputs and at least one output.

21. The apparatus according to claim 18, further comprising a transistor configured as an open collector having an input and an output whose input is connected to the time extender circuit.

22. The apparatus according to claim 18, wherein the time extender circuit further comprises:

a resistor connected between ground and the logic circuit; and a capacitor connected between a voltage and the logic circuit.

23. The apparatus according to claim 19, further comprising at least one inverter having an input and an output, wherein the input of the at least one inverter is connected to an output of the NAND gate.

24. The apparatus according to claim 20, further comprising at least one inverter having an input and an output, wherein the input of the at least one inverter is connected to the at least one output of the plurality of transistors.

25. The apparatus according to claim 23, wherein the at least one inverter is a Schmitt trigger inverter.

26. The apparatus according to claim 24, wherein the at least one inverter is a Schmitt trigger inverter.

* * * * *